United States Patent [19]
Shen et al.

[11] 3,868,414

[45] Feb. 25, 1975

[54] TETRAHYDROFLUORENE CARBOXYLIC ACIDS AND RELATED COMPOUNDS

[75] Inventors: Tsung-Ying Shen, Westfield; Howard Jones, Holmdel, both of N.J.

[73] Assignee: Merck & Co., Inc., Rahway, N.J.

[22] Filed: Jan. 22, 1973

[21] Appl. No.: 325,298

[52] U.S. Cl. ..... 260/515 A, 260/210 R, 260/240 R, 260/327 M, 260/465 D, 260/469, 260/470, 260/471 R, 260/473 F, 260/475 FR, 260/475 SC, 260/515 P, 260/515 M, 260/516, 260/518 R, 260/518 A, 260/519, 260/520, 260/558 R, 260/558 A, 260/558 S, 260/559 R, 260/559 A, 260/559 T, 260/999, 424/308, 424/317

[51] Int. Cl. ..... C07c 63/44, C07c 69/76, C07c 147/00

[58] Field of Search ........ 260/515 A, 515 R, 471 R, 260/470, 518 R, 518 A, 519, 520

[56] References Cited
UNITED STATES PATENTS 3,312,730  4/1967  Winter .............................. 260/473

*Primary Examiner*—James A. Patten
*Attorney, Agent, or Firm*—Mario A. Monaco; Harry E. Westlake, Jr.

[57] ABSTRACT

New substituted tetrahydrofluorene acids, trimethano indenes, their esters, amides and salts and intermediates therefore, which have anti-inflammatory, antipyretic and analgesic activity. Also included are methods of preparing said tetrahydrofluorene and indene compounds, pharmaceutical compositions having said compounds as an active ingredient and methods of treating inflammation by administration of said compounds.

9 Claims, No Drawings

TETRAHYDROFLUORENE CARBOXYLIC ACIDS AND RELATED COMPOUNDS

SUMMARY OF THE INVENTION

This invention relates to new substituted 1-(Ar)-alkylidene (or heteroalkylidene) tetrahydrofluorene and trimethano indene compounds, intermediates therefore and to processes for producing the same. This invention also relates to pharmaceutical compositions containing said tetrahydrofluorene or indene compounds as an active ingredient and to methods of treating pain, fever or inflammation by administering these particular compounds to patients.

DESCRIPTION AND PREFERRED EMBODIMENTS

The invention is more particularly directed to new substituted tetrahydrofluorene and trimethano indene compounds having the following formula:

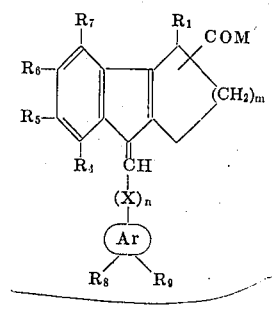

wherein:
- $R_1$ may be hydrogen, halogen, aroyl, aryl, alkylthio, arylthio, aralkylthio, amino, alkylamino, dialkylamino, acylamino, N-heterocyclic, keto, hydroxy, alkoxy, alkenyloxy, alkynyloxy, aralkoxy, haloalkoxy, carboxy, alkoxycarbonyl, aralkoxycarbonyl, alkyl, haloalkyl, alkenyl or alkynyl;
- $R_4$, $R_5$, $R_6$, $R_7$, $R_8$ and $R_9$ each may be hydrogen, alkyl, acyloxy, aryloxy, alkoxy, nitro, amino, acylamino, alkylamino, dialkylamino, alkenyl, alkynyl, alkenyloxy, dialkylaminoalkyl, sulfamyl, alkylthio, alkylsulfinyl, alkylsulfonyl, hydroxy, hydroxyalkyl, acyl, halo, cyano, carboxy, carboalkoxy, carbamido, haloalkyl, cycloalkyl trifluoromethyl, aroyl or cycloalkyloxy;
- x may be alkylene, alkenylene, alkynylene, O, S, SO, $SO_2$, carbonyl or $$\underset{NR}{\overset{R'}{|}}$$

wherein R and R' may each be hydrogen or alkyl;
- $n$ is 0 or 1;
- $m$ is 1 or 2;

may be aryl or heteroaryl; and
M may be hydroxy, alkoxy, aryloxy, ar-alkoxy, $NH_2$, $NR''R'''$ a cation of the group to form the corresponding anhydride of Formula I, and $R''$ and $R'''$ each may be hydrogen, alkyl, aryl, alkylthio, or alkoxy.

The aryl or heteroaryl substituent, (Ar)

may include an aryl ring system such as benzene, naphthalene or biphenyl or a heteroaryl ring system such as a pyrrole, furan, thiophene, pyridine, imidazole, pyrazine, thiazole, pyrimidine, benzothiazole, pyrazole, oxazole, pyrane, pyridazine, indole, thionaphthalene, benzofuran, benzimidazole, azaindole, benzoxyrane, quinoline, isoquinoline, quinoxaline, naphthyridine or benzoxazole and may be substituted with any of the aforementioned $R_8$ and $R_9$ substituents.

In the preferred compounds of this invention
- $R_1$ is hydrogen, $C_{1-5}$ loweralkyl or $C_{1-5}$ chloro, bromo or fluoro loweralkyl;
- $R_4$, $R_5$, $R_6$ and $R_7$ may be hydrogen, halo (chloro, bromo, fluoro), $C_{1-5}$ loweralkyl, halo $C_{1-5}$ loweralkyl, $C_{1-5}$ loweralkoxy, cyano, nitro, amino, $C_{1-5}$ loweralkylamino, $C_{1-5}$ diloweralkylamino, $C_{1-5}$ loweralkanoyloxy, $C_{1-5}$ loweralkanoyl, amino, hydroxy, $C_{1-5}$ loweralkanoyl, $C_{2-5}$ loweralkenoyl, $C_{2-5}$ loweralkenyloxy or trifluoromethyl;
- $R_8$ and $R_9$ are each hydrogen, chloro, bromo, fluoro, $C_{1-5}$ loweralkylthio, $C_{1-5}$ loweralkyl, trifluoromethyl, $C_{1-5}$ loweralkylsulfonyl, $C_{1-5}$ loweralkylsulfinyl, $C_{1-5}$ diloweralkylsulfamyl, nitro or $C_{1-5}$ loweralkoxy;
- x is $C_{1-4}$ alkylene, $C_{2-4}$ alkenylene, $C_{2-4}$ alkynylene or —O—;
- $n$ is 0 or 1;
- $m$ is 1 or 2;

(Ar).

is phenyl; and
M is hydroxy, $C_{1-5}$ loweralkoxy, amino, $C_{1-5}$ loweralkylamino or $C_{1-5}$ diloweralkylamino.

In the most preferred aspect of this invention
- $R_1$ is hydrogen;
- $R_4$, $R_5$, $R_6$ and $R_7$ are each hydrogen, chloro, bromo, fluoro, $C_{1-5}$ loweralkyl, $C_{1-5}$ loweralkoxy, nitro, amino, $C_{1-5}$ loweralkylamino, halo $C_{1-5}$ loweralkyl, $C_{1-5}$ diloweralkylamino, $C_{2-5}$ loweralkanoylamino, hydroxy, $C_{2-5}$ loweralkanoyloxy, $C_{2-5}$ alkenyloxy or trifluoromethyl and especially fluoro or $C_{2-5}$ loweralkenyloxy, at most only 2 of $R_4$, $R_5$, $R_6$ or $R_7$ being other than hydrogen at any one time;
- $R_8$ and $R_9$ are each hydrogen, $C_{1-5}$ loweralkyl, $C_{1-5}$ loweralkoxy, $C_{1-5}$ loweralkylthio, $C_{1-5}$ loweralkylsulfinyl, $C_{1-5}$ loweralkylsulfonyl, chloro, bromo, fluoro, $C_{1-5}$ loweralkylsulfamyl, $C_{1-5}$ diloweralkylsulfamyl or nitro and especially $R_9$ is hydrogen and $R_8$ is $C_{1-5}$ loweralkylthio, $C_{1-5}$ loweralkylsulfinyl or $C_{1-5}$ loweralkylsulfonyl;
- X is $C_{1-4}$ alkylene, $C_{2-4}$ alkenylene, $C_{2-4}$ alkynylene or —O— and especially $C_{1-4}$ alkylene or —O—;
- $n$ is 0 or 1 and especially 0;
- $m$ is 1 or 2;

(Ar)

is phenyl; and
M is hydroxy or $C_{1-5}$ loweralkoxy.

This invention also relates to a method of treating pain, fever or inflammation in patients using a compound of Formula I, particularly and especially the preferred compounds as the active constituent.

The compounds of the instant invention can be used to treat inflammation by reducing inflammation and relieving pain in such diseases as rheumatoid arthritis, osteoarthritis, gout, infectious arthritis and rheumatic fever. The compounds of Formula I can also be used as an anti-pyretic and would be administered and used in the same manner and in same dosage ranges as if they were being used to treat inflammation as discussed further on.

The treatment of inflammation in accordance with the method of the present invention is accomplished by topically, orally, rectally, or parenterally administering to patients a composition of a compound of Formula I, particularly the especially preferred compounds in a nontoxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil and acacia. Exemplary of liquid carriers are peanut oil, olive oil, seasame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or liquid suspension. Suppositories may be prepared in a conventional manner by mixing the compounds of this invention with a suitable non-irritating excipient which is solid at room temperature but liquid at the rectal temperature. Such materials are cocoa butter and polyethylene glycol. Gels and lotions for topical application may be prepared in conventional manners.

The compounds of Formula I and of the compositions of this invention are to be administered in an amount sufficient to treat inflammation, that is to reduce inflammation. Advantageously, the compositions will contain the active ingredient; namely, the compounds of Formula I in an amount of from about 0.1 mg. to 50 mg. per kg. body weight per day (5 mg. to 3.5 mg. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to 15 mg. per kilogram body weight per day. The most rapid and effective anitinflammatory effect is obtained from oral administration of a daily dosage of from about 1 to 15 mg./kg/day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex diet, time of administration, route of administration, rate of excretion, drug combination, reaction sensitivities and severity of the particular disease.

The compounds of this invention may be readily prepared by condensation and dehydration of an appropriate aldehyde, with a compound of the Formula II;

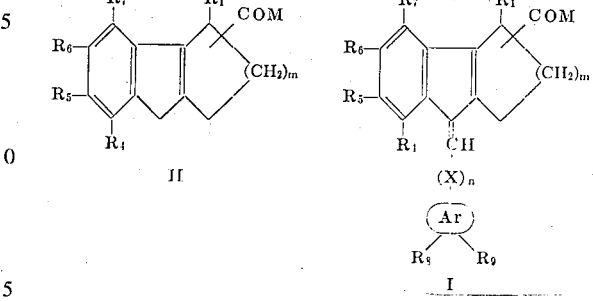

The condensation is carried out by well known methods, as by employing a strong base such as alkali hydroxide or alkoxide and the like, as the catalyst, and in the presence of a solvent, if desired, at ambient or elevated temperatures. The compound (Formula I) where m is 2, that is, the tetrahydrofluorene carboxylic acid compound, may be prepared by reducing the corresponding 2-oxo-1-carboxylic acid, 2-oxo-3-carboxylic acid, or ester precursor (III or V) either directly or via their corresponding 2-S,S'-alkylidene compounds (Formula IV and VI) and preferably by reduction of the later compounds. This reaction is shown by the following flow sheet.

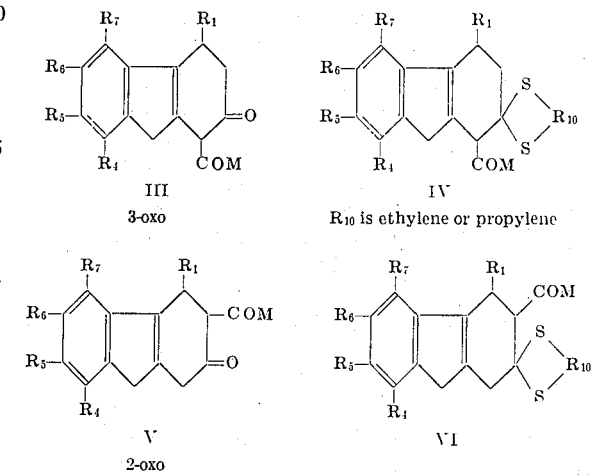

When m is 1, (Formula I), the final products are prepared via the β-oxo-2,3-trimethano indene compound of Formula VII in a similar manner to the 2- and 3-oxo compounds above;

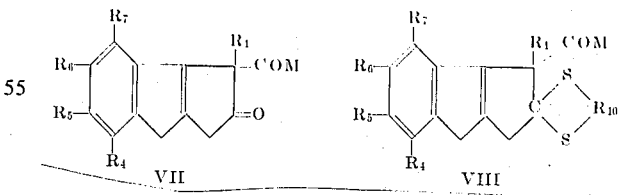

Compound 1 is prepared either by direct reduction of the oxo compounds under reducing conditions which are known not to attack either the carboxyl or other substituents on the molecule or preferably by first reacting the keto compounds with an alkyldithiol, preferably, ethanedithiol or propanedithiol (especially ethanedithiol) in the presence of a solvent at elevated temperatures, especially a solvent which will axeotrope water such as benzene, followed by reduction of the dithioketal compound (Formula IV, VI, VIII) thus formed under conditions well known for the reduction of a dithioketal group to the methylene group. For example, reduction may be carried out in a solvent such as an alkanol with Raney nickel at elevated temperatures.

The oxo compounds in turn are prepared by various methods depending upon the oxo compound desired. For example, the 2-oxo compound (Formula III) is prepared from a 2-methyl-3-indenyl propionic acid or ester, by first reacting said compound with an N-halosuccinimide in a solvent at elevated temperatures to form the 2-halomethyl compound. This compound in turn converted to its corresponding 2-cyanomethyl compound by the well known reaction for preparing nitriles from halo compounds (i.e., reaction with a metal cyanide). The cyanide compound is then hydrolyzed to the corresponding acid which in turn is converted to the ester to form a diethyl-2-acetate-3propionic indene. This diester is then cyclized to the 2-oxo compound by reaction in an inert solvent at elevated temperatures in the presence of a strong base such as sodium metal and an alcohol, sodium amide, diisopropyl magnesium bromide or sodium hydride. On the other hand, the 2-oxo compound (Formula V) is prepared from a 2-methyl-3-indenyl acetic acid or ester by first reacting this compound with a N-halosuccinimide in a solvent at elevated temperatures to form the corresponding 2-halomethyl compound which in turn, is hydrolyzed by well known means to the 2-hydroxy-methyl compound. The 2-carboxyaldehyde is then prepared by oxidation of the hydroxymethyl compound by methods well known to the art such as reaction in the presence of manganese dioxide, in a solvent at elevated temperatures. The 2-carboxaldehyde is converted to the 2-vinylacetic acid by reaction with malonic acid at elevated temperatures in an inert solvent. The corresponding 2-propionic 3-acetic diacid is prepared by catalytic reduction of the 2-vinylacetic acid compound, such as with Pd/C in an inert solvent at ambient or elevated temperatures. The diacid is converted to the corresponding diester (i.e., alkyldiester) which compound is then cyclized to form the 2-oxo compound in a manner described previously for the 2-oxo compound (Formula III).

Finally, the β-oxo compound (Formula VII) is prepared from a 2-methyl-3-indenyl acetic acid or ester by reaction of this compound in a manner similar to 2-methyl-3-indenyl propionic acid or esters above, to form the 2-acetaldehyde-3-acetic acid or ester compound. This compound is then cyclized in a manner as previously described for the 2-oxo compound (Formula III).

Although it is preferred to add the benzylidenyl moiety of the compounds of this invention as a last step, one can also carry out this step during any part of the reaction sequences.

The intermediate compounds of this invention (Formula II and VIII) are novel, and as such, form another aspect of this invention.

The following examples are given by way of illustration.

EXAMPLE 1

6-Fluoro-9-(p-methylsulfinylbenzylidene)1,2,3,4-tetrahydrofluorene-1-carboxylic acid A. 5-Fluoro-2-methylindenyl-β-ethanol Methyl 5-fluoro-2-methyl indenyl-3-acetate (9.8 g.) is added in ether (75 ml.) to a suspension of lithium aluminum hydride (1.0 g.) in ether (50 ml.) over 30 minutes. The reaction mixture is refluxed and stirred for 30 min., cooled methanol (50 ml.) slowly added and filtered through celite. The solution is dried ($MgSO_4$) filtered and concentrated to give an oil. The oil is chromatographed on silica-gel 10 in. x 2 in. column (Baker analyzed 60 to 200 mesh). Elution with 200 ml. portions of benzene gives the title compound m.p. 64-66°.

B. 5-Fluoro-2-methylindenyl-β-ethyl chloride

The above compound (0.1 mole) is refluxed in benzene (100 ml.) with thionyl chloride (0.11 mole) with a drop of dimethylformamide for 2 hrs. and evaporated to dryness. The oily ethyl chloride compound is used crude in the next reaction.

C. 5-Fluoro-2-methylindenyl-β-propionitrile

5-Fluoro-2-methylindenyl-β-ethylchloride (0.1 mole) and the dry sodium cyanide (0.11 mole) are stirred together at 60° in dry redistilled dimethylformamide (100 ml.) for 1 hr. The reaction mixture is cooled, the sodium chloride filtered off, and the filtrate evaporated to one-third volume. The crude propionitrile is extracted into ethyl acetate (100 ml.) and washed well with water 12 × 25 ml. The filtrate is evaporated and put on a 1 ft. × 25 in. silica-gel column (Baker analyzed 60–200 mesh) elution with mixtures of ether-alcohol gives the compound pure.

D. 5-Fluoro-2-methylindenyl-3-propionate

The above nitrile (0.2 mole) is refluxed in concentrated hydrochloric acid (200 ml.) and ethanol (100 ml.) for 3 hours at the end of this time all the nitrile has been hydralyzed and the ester is obtained by evaporating off the ethanol and extracting it into carbontetrachloride (2 × 300 ml.).

E. Ethyl 2-bromomethyl-5-fluoroindenyl-3-propionate

The carbontetrachloride solution of the ester above is evaporated to half its original volume. To this solution is added (0.2 mole) or N-bromosuccinimide and the solution is refluxed for 4 hours. Evaporation leaves an oil which crystallizes on standing to give the subject compound.

F. Ethyl 2-cyanomethyl-5-fluoroindenyl-3-propionate

The above halomethyl compound (0.4 mole) in dry dimethylsulfonamide (100 ml.) is kept at 100° under nitrogen while potassium cyanide (0.44 mole) is added while stirring. The reaction is poured into ice-water (1 liter) after 4 hours and the organics extracted into ethyl acetate (3 × 200 ml.). The organic layer is dried ($MgSO_4$), filtered and evaporated to dryness. The nitrile crystallizes from benzene solution.

G. Diethyl 5-fluoroindenyl-2-acetate-3-propionate

The above nitrile (0.3 mole) is refluxed overnight in ethanol (200 ml.) and concentrated hydrochloric acid (100 ml.), extracted into ethyl acetate (3 × 200 ml.) and water again. The organic layer is dried ($MgSO_4$), filtered and evaporated to dryness. The diester is an oil.

H. Ethyl 6-Fluoro-2-oxo-1,2,3,4-tetrahydrofluorene-1-carboxylate

Molten sodium (0.22 g. atom) is stirred vigorously in toluene (100 ml.) at 100° so that a fine suspension is obtained. It is then cooled and while stirring under nitrogen the diester (0.2 mole) made in part G above in toluene (100 ml.) is stirred with ethanol (0.2 ml.). The mixture is refluxed for 4 hours under nitrogen and evaporated to dryness, water (100 ml.) is added and the solution is refluxed for 1 hour, the mixed fluorenes extracted with ether (2 × 100 ml) and the ether layer dried (MgSO₄). The drying agent is filtered off and the solvent evaporated to dryness.

The oil is taken up in ethyl acetate (100 ml.), washed with water (2 × 20 ml.), separated and dried (MgSO₄). The filtered organic solution is evaporated to dryness and put on a column of silica gel (24 in × 2 in.) and chromatographed using a mixture of ether-n-hexane as eluate, to obtain the 1-carboxylic ester.

I. Ethyl 2-S,S'-ethylidene-6-fluoro-1,2,3,4-tetrahydro-fluorene-1-carboxylate

The above ester (0.2 mole) is refluxed in ethanethiol (0.2 mole) in benzene (100 ml.) containing p-toluene sulfonic acid (100 ml.) with continuous removal of water under a Dean-Stark water trap for 48 hours. At the end of this time the benzene soultion is evaporated to dryness and the product is used as isolated in the next reaction.

J. Ethyl 6-fluoro-1,2,3,4-tetrahydrofluorene-1-carboxylate

The above dithioketal (0.2 mole) is refluxed in ethanol (500 ml.) containing (200 g.) Raney nickel with stirring under nitrogen for 3 hours. After this time the nickel is filtered off and the solvent evaporated to gove an oil which is fractionally distilled under high vacuum to give pure ester.

K. 6-Fluoro-9-(p-methylsulfinylbenzylidene)-1,2,3,4-tetrahydrofluorene-1-carboxylic acid 5.0 mmole of ethyl-7-fluoro-1,2,3,4-tetrahydrofuorene-2-carboxylate is dissolved in 10 ml. of dry pyridine followed by 5.0 mmole of p-methylsulfinylbenzaldehyde. The flask is placed under nitrogen and 5.1 mmole of Triton B is added.

The reaction mixture is allowed to stand overnight and then 2 mole of water is added. After standing for 15 minutes it is poured into an excess of water. The organics are extracted with ether (2 × 55 ml.). the aqueous phase is added to 10% HCl ice. The precipitated material is extracted into methylene chloride and dried (MgSO₄). The solvent is removed, filtered and recrystallized from benzene to yield the desired product.

Similarly, when benzaldehyde, p-methylthiobenzaldehyde, p-methylsulfonylbenzaldehyde, p-chlorobenzaldehyde, m-chlorobenzaldehyde, p-fluorobenzaldehyde, p-ethylthiobenzaldehyde, m-nitrobenzaldehyde, m-diethylaminobenzaldehyde, p-methylbenzaldehyde or p-methoxybenzaldehyde is used on an equivalent amount in place of p-methylsulfinylbenzaldehyde in 1K above, there is obtained the corresponding appropriately 6-fluoro-9-substituted 1,-2,3,4-tetrahydrofluorene-1-carbocylic acid compound.

Similarly, when an equivalent amount of
methyl 5-hydroxy-2-methyl-3-indenyl acetate,
methyl 5-methoxy-2-methyl-3indenyl acetate,
methyl-5-cyano-2-methyl-3-indenyl acetate,
ethyl 5-fluoro-3-indenyl acetate,
methyl 5,6 difluoro-2-methyl-3-indenyl acetate,
methyl 5-chloro-2-methyl-3-indenyl acetate,
methyl 5-trifluormethyl-2-methyl-3-indenyl acetate,
methyl 5-methyl-2-methyl-3-indenyl acetate,
methyl 5,7-difluoro-2-methyl-3-indenyl acetate.
methyl 5-dimethylamino-2-methyl-3-indenyl acetate,
methyl 5-allyloxy-2-methyl-3-indenyl acetate and
methyl 5-methoxy-6-fluoro-2-methyl-3-indenyl acetate are used in place of methyl-5-fluoro-2-methylindenyl-3-acetate in 1A above, and the compound therefrom is reacted in accordance with steps 1B to K, there is obtained the corresponding 9-(p-methylsulfinylbenzylidene)-substituted-1,2,3,4-tetrahydrofluorene-1-carboxylic acids.

EXAMPLE 2

6-Fluoro-9-(p-methylsulfinylbenzylidene)-1,2,3,4-tetrahydrofluorene-4-carboxylic acid A. 5-Fluoro-2-hydroxymethylindenyl-3-acetic acid Ethyl 5-fluoro-2-methylindenyl acetate (4.6 g.) in carbon tetrachloride (75 ml.) is refluxed under nitrogen with stirring with N-bromosuccinimide (3.6 g.) for 3 hours. The succinimide is filtered off and the solvent evaporated to give an oil.

This oil is dissolved in tetrahydrofuran (100 ml.) and water (30 ml.) and the solution allowed to stand at room temperature overnight. All the tetrahydrofuran is evaporated off and the product extracted into methylene chloride (2 × 50 ml.) from whence it crystallizes after drying (MgSO₄) and evaporating the organics to half-volume.

b. 5-Fluoro-2-carboxaldehydeindenyl-3-acetic acid

The above hydroxymethyl compound (0.2 ml.) is oxidized at room temperature by stirring it in tetrahydrofuran (300 ml.) with activated manganese dioxide (80 gm.) for 4 hours. The manganese dioxide is filtered off and the solvent removed to leave crystalline 2-carboxaldehyde.

C. 5-Fluoroindene-2-vinylacetic-3-acetic dicarboxylic acid

Piperidine (0.4 mole) the above aldehyde (0.2 mole) and malonic acid (0.2 mole) are refluxed in pyridine (400 ml.) for 14 hours and then evaporated to an oil. The oil is dissolved in saturated sodium carbonate solution and extracted with chloroform (2 × 300 ml.) and acidified with concentrated hydrochloric acid and ice. The free acid is filtered, washed well with water and dried in a vacuum oven at 40° over phosphorous pentoxide.

D. 5-Fluoroindene-2-propionic-3-acetic dicarboxylic acid

The above diacid (0.3 mole), Pd/C catalyst (1g. 5%) in ethyl acetate (300 ml.) is hydrogenated at 42 p.s.i. and room temperature until the theoretical amount of hydrogen (0.3 mole) has been absorbed. The catalyst is filtered off and the material evaporated to dryness to give the solid diacid.

E. Diethyl-5-fluoroindene-2-propionate-3-acetate

The above diacid (0.2 mole) in absolute ethanol (200 ml.) is refluxed with concentrated sulfuric acid (0.5 ml.) for 3 hours, evaporated at room temperature to one third its original volume and extracted from ethyl acetate (100 ml.) with saturated sodium bicarbonate solution. The organic layer is washed with water (20 ml.) and separated. It is dried (MgSO₄) filtered and evaporated to dryness to give the diester as an oil.

F. Ethyl 6-Fluoro-3-oxo-1,2,3,4-tetrahydrofluorene-4-carboxylate

The above diester (0.4 mole) is cyclized exactly as described in Example 1E and chromatographically separated on a silica-gel column in an analogous way to separate the desired 4-carboxylate ester from the 2-isomer.

G. 6-Fluoro-1,2,3,4-tetrahydrofluorene-9-(p-methylsulfinylbenzylidene)-4-carboxylic acid The compound of Example 2F above is reacted in accordance with Example 1I above and subsequently carried through Example 1J and K to obtain the above compound.

Similarly, when the other methyl and ethyl indenyl esters as descrbed in Example -(p-methylsulfinylbenzylidene)-1 1,2,3,4are used in an equivalent amount in place of ethyl-5-fluoro-2-methylindenyl acetate in Example 2A above and the product reacted in accordance with Example 2B-G, there is obtained the corresponding 6-fluoro-9-(p-methylsulfinylbenzylidene)-substituted-1,2,3,4-tetrahydrofluorene-4-carboxylic acid compounds.

Similarly, when the other aldehydes shown in Example 1 are used in an equivalent amount in place of p-methylsulfinylbenzaldehyde in Example 2G above, there is obtained the corresponding 6-fluoro-9-(substituted-benzylidene)-1,2,3,4-tetrahydrofluorene-4-carboxylic acid compounds.

EXAMPLE 3

5-Fluoro-(α-carboxy-(2,3)-trimethano]-1-(p-methylsulfinylbenzylidene)-indene

A. Ethyl 2-bromomethyl-5-fluoroindenyl-3-acetate

To 0.2 mole of ethyl-5-fluoro-2-methylindenyl-3-acetate in 300 ml. of carbontetrachloride is added 0.2 mole of N-bromosuccinimide and the reaction mixture refluxed for 4 hours. The reaction mixture is then evaporated to leave the subject compound.

B. Ethyl-2-cyanomethyl-5-fluoroindenyl-3-acetate

The above halomethyl compound (0.4 mole) in dry dimethylformide (100 ml.) is kept at 100° under nitrogen while potassium cyanide (0.44 mole) is added while stirring. The reaction is poured into ice-water (1 liter) after 4 hours and the organics extracted into ethyl acetate (3 × 200 ml.). The organic layer is dried (MgSO₄), filtered and evaporated to dryness. The nitrile crystallizes from benzene solution.

C. Ethyl-5-fluoroindenyl-2-cyanomethyl-2-α-bromoacetate

To 0.1 mole of the above cyanomethyl compound in tetrahydrofuran (200 ml.) is added a solution of bromine (0.09 mole) in tetrahydrofuran (100 ml.) with stirring at 10°–20° over 2 hours. The reaction mixture is stirred for 18 hours at room temperature and poured into saturated sodium bicarbonate solution (700 ml.). The organic material is extracted into ether (2 × 300 ml.), the ether layer is washed with (2 × 50 ml.) of water, separated and dried (MgSO₄). The product is chromatographed on a column of silica-gel (Baker analyzed 20 in. × 2 in.) and the pure bromo ester is separated from some other halogenated material using a mixture of benzene-N-hexane.

D. 5-Fluoro-[α-carboethoxy-β-oxo-(2,3)-trimethano]-indene

To a solution of the bromo ester prepared above (0.4 mole) in ether (300 ml.) is added powdered zincn (dried 0.6 mole) and a crystal of iodine. The solution is gently warmed to promote gentle reflux under nitrogen over 2 hours. After this time the solution is refluxed for 12 hours and cooled. The ether solution is washed with saturated ammonium chloride solution (3 × 200 ml.), water (1 × 200 ml.), saturated sodium bicarbonate solution (1 × 70 ml.) and finally, water again. The organic layer is dried (MgSO₄), filtered and evaporated to dryness. The oil is chromatographed on silica-gel (Baker analyzed) 1 ft. × 2 in. and the fractions separated using mixtures of n-hexane-benzene.

E. 5-Fluoro-[α-carboethoxy-2,3-trimethano]-indene

The above α-carboethoxy-β-oxo compound is reacted in accordance with Example I I and J to obtain the title.

F. 5-Fluoro-[α-carboxy-2,3-trimethano]-1-(p-methylsulfinylbenzylidene)-indene

Condensation of above with p-methylsulfinylbenzylidene in accordance with Example 1K leads to the subject compound.

Similarly, when an equivalent amount of the other methyl and ethyl indenyl acetate compounds as described in Example 1 are used in place of the indenyl acetate in Example 3A above, and the reaction product, reacted in accordance with Example 3B-F, there is obtained the corresponding substituted-(α-carboxy-2,3-trimethano]-1-(p-methylsulfinylbenzylidene)-indene compound.

Similarly, when an equivalent amount of the other benzaldehydes of Example 1 are used in place of p-methylsulfinylbenzaldehyde in Example 3F above, there is obtained the corresponding 5-fluoro-[α-carboxy-2,3-trimethano]-1-(substituted benzylidene)-indene.

EXAMPLE 4

6-Fluoro-9-(p-methylsulfinylcinnamylidenyl)-1,2,3,4-tetrahydrofluorene-1-carboxylic acid 5.0 mmole of ethyl-6-fluoro-1,2,3,4-tetrahydrofluorene-1-carboxylate is dissolved in 10 ml. of dry pyridine followed by 5.0 mmole of p-methylsulfinylcinnamaldehyde. The flask is placed under nitrogen and 5.1 mmole of Triton B is added. The reaction mixture is allowed to stand overnight and then 2 mole of water is added. After standing for 15 minutes it is poured into an excess of water. The organics are extracted with ether (2 × 50 ml.). The aqueous phase is added to 10% HCl ice. The precipitated material is extracted into methylene chloride and dried (MgSO₄). The solvent is removed, filtered and recrystallized from benzene to yield the desired product.

Similarly, when an equivalent amount of ethyl-6-fluoro-1,2,3,4-tetrahydrofluorene-4-carboxylate or 5-fluoro-[α-carboethoxy-2,3-trimethano]-indene is used in place of ethyl-6-fluoro-4,2,3,4-tetrahydrofluorene-1-carboxylate in the above example, there is obtained 6-fluoro-9-(p-methylsulfinylcinnamylidenyl)-1,2,3,4-tetrahydrofluorene-4-carboxylic acid or 5-fluoro-[α-carboxy-2,3-trimethano]-1-(p-methylsulfinylcinnamylidenyl)-indene, respectively.

Similarly, when an equivalent amount of the aldehyde of Table 1 below is used in place of 4-methylsulfinylcinnamaldehyde in the above procedure, the corresponding 6-fluoro-9-(substituted)-1,2,3,4-tetrahydrofluoro-1-carboxylic acid is obtained.

TABLE 1

α-tolualdehyde
cinnamaldehyde
hydrocinnamaldehyde
2-methoxycinnamaldehyde
4-methoxycinnamaldehyde
4-ethoxycinnamaldehyde
3,4-dimethoxycinnamaldehyde
4-methylcinnamaldehyde
4-t-butylcinnamaldehyde
2-nitrocinnamaldehyde
3-nitrocinnamaldehyde
4-nitrocinnamaldehyde
4-dimethylaminocinnamaldehyde
4-diethylaminocinnamaldehyde
2-chlorocinnamaldehyde
4-chlorocinnamaldehyde
2,4-dichlorocinnamaldehyde
4-bromocinnamaldehyde
4-methylthiocinnamaldehyde
4-methylsulfinylcinnamaldehyde
4-methylsulfonylcinnamaldehyde
4-chloro-α-methylcinnamaldehyde 4-chloro-2-nitrocinnamaldehyde
4-chloro-3-nitrocinnamaldehyde
5-chloro-2-methylcinnamaldehyde
4nitro-α-methylcinnamaldehyde
4-nitro-β-methylcinnamaldehyde
4-nitro-β-phenylcinnamaldehyde
α-methylcinnamaldehyde
α-ethylcinnamaldehyde
β-methylcinnamaldehyde
β-ethylcinnamaldehyde
α-β-dimethylcinnamaldehyde
α-pentylcinnamaldehyde
α-cyclopentylcinnamaldehyde
3,4-methylenedioxycinnamaldehyde
3,4,5-trimethoxycinnamaldehyde
3,4-dimethoxy-α-methylcinnamaldehyde
4-isopropyl-α-methylcinnamaldehyde
4-methoxyhydrocinnamaldehyde
2-methylhydrocinnamaldehyde
4-methylhydrocinnamaldehyde
4-secbutylhydrocinnamaldehyde
4-nitrohydrocinnamaldehyde
4-chlorohydrocinnamaldehyde
4-methylthiohydrocinnamaldehyde
4methylsulfinylhydrocinnamaldehyde
4-methylsulfonylhydrocinnamaldehyde
4-nitro-α-methylhydrocinnamaldehyde
4-nitro-β-methylhydrocinnamaldehyde
4-chloro-α-methylhydrocinnamaldehyde
4-chloro-β-methylhydrocinnamaldehyde
α-methylhydrocinnamaldehyde
β-methylhydrocinnamaldehyde
α,α-dimethylhydrocinnamaldehyde
4-chloro-α-tolualdehyde
4-methoxy-α-tolualdehyde
4-methylthio-α-tolualdehyde
α-methyl-α-tolualdehyde
α-ethyl-α-tolualdehyde
4-nitro-α-methyl-α-tolualdehyde
4chloro-α-methyl-α-tolualdehyde
4-phenylbutanal
4phenyl-2-butenal
β-(2'-thienyl)-propenal
α-(2'-thienyl)propanal
3'-pyridylacetaldehyde
4'-pyridylacetaldehyde
2'-pyridylacetaldehyde
2'-furylacetaldehyde
5'-chloro-2'-thienylacetaldehyde
α-naphthylacetaldehyde
β-naphthylacetaldehyde
β-(2'-furyl)propenal
β-(2'-pyridyl)propenal
β-(α'-naphthyl)propenal
β-(3'-pyridyl)propenal
β-(4'-pyridyl)propenal
β-(2'-furyl)propanal
β-(2'-pyridyl)propanal
β-(α'-naphthyl)propanal
β-(2'-quinolyl)propanal
β-(2'-pyrrolidinyl)propanal
β-(2'-benzofuranyl)propanal
β-(2'-quinolyl)propenal
β-(2'-pyrrolidinyl)propanal
β-(2'-naphthyl)propenal
β,β-diphenylpropenal
2'-indancetaldehyde
β-(2'-benzothiazole)propenal
β-(3'-nitro-2'-thienyl)propenal
β-(1'-methyl-2'-pyrrolyl)propenal
β-(1'-methyl-2'-pyridyl)propenal Similarly, when an equivalent amount of the other ethyl-substituted-1,2,3,4-tetrahydrofluorene-1-carboxylate, ethyl-substituted-1,2,3,4-tetrahydrofluorene-4-carboxylate and substituted [α-carbethoxy-2,3-trimethanol]-indene compounds of Examples 1, 2 and 3 respectively are used in place of ethyl-6-fluoro-1,2,3,4-tetrahydrofluorene-1-carboxylate in the above Example, there is obtained the corresponding substituted -9-(p-methylsulfinylcinnamylidenyl)-1,2,3,4-tetrahydrofluorene-4 and 1-carboxylic acids and substituted [α-carboxy-2,3-trimethano]-1-(p-methylsulfinylcinnamyldenyl)-indene, respectively.

EXAMPLE 5

A. (3-Chloro-4-methylthio)-phenylpropargaldehyde

A mixture of 3-chloro-4-methylthiocinnamaldehyde (2.0 mole) and acetic acid (1.5 liter) is stirred vigorously under nitrogen while bromine (320 g., 2.0 mole) is added dropwise at 25°. Powdered anhydrous potassium carbonate is added at 25°. When the evolution of gas stops, the mixture is refluxed for 30 minutes, cooled and poured into cold water (2.5 liters). The mixture is cooled to 0°–5° with stirring and stirred at this temperature overnight. The precipitate is separated by filtration without drying and crystallized from ethanol-water. 3-Chloro-4-methylthio-α-bromocinnamaldehyde is filtered, washed and dried in air.

The aldehyde (1.6 mole), methyl orthoformate (244 g., 2.3 mole), absolute ethanol (320 ml.) and ammonium chloride (4.0 g.) are refluxed for 30 minutes, low boiling components distilled at atmospheric pressure and distilled in vacuo to yield 1,1-dimethoxy-3-(3'-chloro-4'-methylthiophenyl)-2-propene. To this compound (1.35 mole) is added potassium hydroxide (132 g., 2.0 moles) in methanol (1400 ml.). The mixture is refluxed for 3 hours and poured into water (11.3 liters). The mixture is extracted with chloroform (3 × 1.5 liter), the combined chloroform extracts washed with water (3 × 660 ml.) and dried (Na₂SO₄). The chloroform is distilled and the residue fractionated in vacuo to obtain 1,1-dimethoxy-(3'-chloro-4'-methylthiophenyl)-2-propyne. This compound (1.0 mole) is added to water (1 liter) containing concentrated sulfuric acid (70 ml.) and the mixture is heated on the steam bath for 30 minutes with occasional mixing. The mixture is extracted with ether (3 × 750 ml.), the ether extract washed with water and saturated salt solution, dried (Na₂SO₄) and concentrated to an oil at atmospheric pressure. The oil is distilled in vacuo to yield (3-chloro-4-methylthio)-phenylpropargaldehyde.

B. 6-Fluoro-9-(3'-chloro-4'-methylthiophenylpropargylindene)-1,2,3,4-tetrahydrofluorene-1-carboxylic acid (3-Chloro-4-methylthio)-phenylpropargaldehyde (0.2 mole) and ethyl-6-fluoro-1,2,3,4-tetrahydrofluorene-1-carboxylate (0.2 mole) are condensed by the method of Example 1K to yield the subject compounds.

Similarly, when the other 1,2,3,4-tetrahydrofluorene-1-carboxylate compounds obtained from Example 1 are used in place of ethyl-6-fluoro-1,2,3,4-tetrahydrofluorene-1-carboxylate in the above example, there is obtained the corresponding 9-(3'-chloro-4'-methylthiophenylpropargylidene) substituted 1,2,3,4-tetrahydrofluorene-1-carboxylic acid compounds.

Similarly, when an equivalent amount of ethyl-6-fluoro-1,2,3,4-tetrahydrofluorene-4-carboxylate or 5- fluoro-[α-carboethoxy-2,3-trimethano]-indene obtained from Example 2 and 3 respectively are used in place of ethyl-6-fluoro-1,2,3,4-tetrahydrofluorene-1-carboxylate in the above Example, there is obtained 6-fluoro-9-(3'-chloro-4'-methylthiophenylpropargylidene)1,2,3,4-tetrahydrofluorene-4-carboxylic acid or 5-fluoro-[α-carboxy-2,3-trimethano]-1-(3'-chloro-4'-methylthiophenylpropargylidene)-indene respectively.

EXAMPLE 6

A. t-Butyl 6-fluoro-1,2,3,4-tetrahydrofluorene-4-carboxylate

Ethyl 6-fluoro-1,2,3,4-tetrahydrofluorene-1-carboxylate (1.0 mole), t-butyl acetate (700 g., 6.0 mole) and sodium methoxide (108 g., 2 mole) under nitrogen are stirred and refluxed at 10:1 ratio through a 1.5' column packed with glass ⅛ inches helices. The mixture is distilled for 18 hours and 250 ml. of distillate is collected. The excess of t-butylacetate is distilled in vacuo and the residue is taken up in methylene chloride, filtered through diatomaceous earth then through acid-washed alumina. The methylene chloride is removed and the residue crystallized from acetone-n-hexane to yield the subject product.

B. t-Butyl 6-fluoro-9-hydroymethylene-1,1,3,4-tetrahydrofluorene-1-carboxylate Sodium Salt To a mixture of t-butyl 7-fluoro-1,2,3,4-tetrahydrofluorene-2-carboxylate (0.2 mole) in benzene (500 ml.) and ethyl formate (74.1 g., 1.0 mole) is added oil-free sodium hydride (72. g., 0.3 mole). The mixture is stirred at room temperature 1 hour each day for 2 days. Any remaining sodium hydride is decomposed by the addition of methanol (20 ml.) in ether (100 ml.). The salt is filtered, washed with ether and dried in vacuo.

C. t-Butyl-6-fluoro-9-(p-methylthiophenoxymethylidene)-1,2,3,4-tetrahydrofluorene-1-carboxylate The sodium salt (0.01 mole) from Example 6B in dimethoxyethane (200 ml.) is heated at reflux with stirring for 15 hours with p-methylthiophenyl iodide (25.0 g., 0.01 mole). The mixture is concentrated in vacuo to remove solvent, taken up in methylene chloride-water, the layers separated and the water layer extracted with methylene chloride (2 × 100 ml.). The combined methylene chloride layers are concentrated to one-third volume and chromatographed over silica gel and eluted by methanolic chloroform to yield the product.

Similarly, when an equivalent amount of any one of the other substituted-ethyl-1,2,3,4-tetrahydrofluorene-1-carboxylate compounds obtained from the corresponding methyl and ethyl indenyl acetates described in Example 1 are used in place of ethyl-6-fluoro-1,2,3,4-tetrahydrofluorene-1-carboxylate in Example 6A above and the resulting product used in Example 6B–C, there are obtained the corresponding substituted-t-butyl-9-(p-methylthiophenoxymethylildene)-1,2,3,4-tetrahydrofluorene-1-carboxylate compounds.

Similarly, when ethyl-6-fluoro-1,2,3,4-tetrahydrofluorene-4-carboxylate or 5-fluoro-[α-carboethoxy-2,3-trimethano]-indene obtained from Examples 2 and 3 respectively, are used in place of ethyl-6-fluoro-1,2,3,4-tetrahydrofluorene-1-carboxylate in Example 6A and the product reacted in accordance with Example 6B-C, there is obtained the corresponding 4-carboxylate or indene compound respectively.

EXAMPLE 7

6-Fluoro-9-(p-methylsulfinylbenzylidene)-1,2,3,4-tetrahydrofluorene-1-carboxy-β-D-glycopyranosiduronic acid Sodium methoxide (25% solution 30 ml.) is added to a stirred solution of 6-fluoro-9-(p-methylsulfinylbenzylidene)1,2,3,4-tetrahydrofluorene-1-carboxylic acid (0.13 M) in tetrahydrofluorene (800 ml.). The precipitate is filtered off and dried at 60° under vacuum.

Methyl (tri-0-acetyl-α-D-glucoypranosylbromide)-uronate is made according to a procedure described in J. Amer. Chem. Soc. 77 3310 (1955) or J. Amer. Chem. Soc. 82 2827 (1960).

The dry sodium salt (0.1 M) and the bromopyranoside (0.12 M) are heated in dry dimethyl sulfoxide with stirring at 60° for 2 hours. The product was used as is, the free acid, is a biproduct of the next reaction.

The crude product (13 gm.) in dimethoxyethane (125 ml.) and 2.5N hydrochloric acid (62.5 ml.) is heated to 90° for 3 hours. The solution is evaporated at 70° to one-half volume and extracted with methylene chloride (2 × 30 ml.). The solution is then saturated with sodium chloride and extracted with methylene chloride again (30 ml.), then ethyl acetate (2 × 50 ml.) and this last extraction washed with water (20 ml.), dried (anhydrous magnesium sulfate), filtered and evaporated to dryness. In this way the glucuronide is isolated from the starting material.

Similarly, when an equivalent amount of 6-fluoro-9-(p-methylsulfinylbenzyl)-1,2,3,4-tetrahydrofluorene-4-carboxylic acid and 5-fluoro-[α-carboxy-2,3-trimethano]-1-(p-methylsulfinylbenzylidenyl)-indene obtained from Examples 2 and 3 respectively are used in place of 6-fluoro-9-(p-methylsulfinylbenzylidenyl)-1,2,3,4-tetrahydrofluorene-1-carboxylic acid in the above example, there are obtained the corresponding β-p-glucopyranosiduronic acid compounds.

EXAMPLE 8

6-Fluoro-9-(p-methylsulfinylbenzylidene)-1,2,3,4-tetrahydrofluorene-1-carboxylic acid anhydride A solution of 0.05 mole of N,N'-dicyclohexyl carbodimide in 60 ml. of tetrahydrofuran is added to 0.05 mole of 6-fluoro-9-(p-methylsulfinylbenzylidene)-1,2,3,4-tetrahydrofluorene-1-carboxylic acid in 25 ml. of tetrahydrofuran. The reaction mixture is shaken vigorously at about 25° for 16 hours. The dicyclohexylurea is filtered off and 2 ml. of glacial acetic acid is added to the filtrate. The solution is allowed to stand for 1 hour, filtered and 200 ml. of ether added to the filtrate. The filtrate is then extracted well with water dried and concentrated. The desired product is purified by column chromatography on silica gel using ether-petroleum ether as an eluent.

Similarly, when an equivalent amount of 6-fluoro-9-(p-methylsulfinylbenzylidenyl)-1,2,3,4-tetrahydrofluorene-4-carboxylic acid and 5-fluoro-[α-carboxy-2,3-trimethano]-1-(p-methylsulfinylbenzylidenyl)-indene are used in place of 6-fluoro-9-(p-methylsulfinylbenzylidenyl)-1,2,3,4-tetrahydrofluorene-1-carboxylic acid, there are obtained the corresponding anhydrides.

EXAMPLE 9

Esters of 6-fluoro-9-(p-methylsulfinylbenzylidene)-1,2,3,4-tetrahydrofluorene-1-carboxylic acid (A) Simple Esters — A mixture of .1 mole of 6-fluoro-9-(p-methylsulfinylbenzylidene)-1,2,3,4-tetrahydrofluorene-1-carboxylic acid .2 g. of p-toluene sulfonic acid, 100 ml. of absolute ethanol and 75 ml. of dry benzene is refluxed on a steam bath while slowly distilling the solvent. After 17 hours, the residual solvent is removed under reduced pressure. The residue is slurried in aqueous sodium bicarbonate and then with water until neutral. The resulting ethyl ester may be recrystallized from organic solvents such as ethyl acetate, benzene and the like. When methanol, propanol, t-butanol and benzyl alcohol are used instead of the ethanol in the above procedure, there is obtained the corresponding methy, propyl, t-butyl and benzyl esters.

(B) Alkoxyalkyl Esters — Chloromethyl methyl ether (0.055 mole) is added to a suspension of 6-fluoro-9 -(p-methylsulfinylbenzylidene)-1,2,3,4-tetrahydrofluorene-1-carboxylic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluent, to give methoxymethyl 6-fluoro-9-(p-methylsulfinylbenzylidene)-1,2,3,4-tetrahydrofluorene-1-carboxylate.

(C) Phenyl 6-fluoro-9-(p-methylsulfinylbenzylidenyl) -1,2,3,4-tetrahydrofluorene-1-carboxylate — A solution of 0.0054 mole of N,N'-dicyclohexylcarbodiimide in 6 ml. of anhydrous tetrahydrofuran is addes to a solution of 6-fluoro-9-(p-methylsulfinylbenzylidenyl)-1,2,3,4tetrahydrofluorene-1-carboxylic acid (0.005 mole) and phenol (0.0054 mole) in 17 ml. of anhydrous tetrahydrofuran. The mixture is shaken vigorously and allowed to sit, stoppered, at room temperature overnight.

After filtering off the N,N'-dicyclohexylurea, 2 ml. of glacial acetic acid is added to the filtrate and the mixture allowed to stand one hour. After filtering, 200 ml. ether is added to the filtrate and the ether solution and 3 × 100 ml. water and then dried over anhydrous sodium sulfate. The mixture is filtered, concentrated in vacuo to 25 ml. and chromatographed on a 150 g. acid washed alumina column using ether-petroleum ether (v./v. 10–60 percent) as eluent to give phenyl 6-fluoro-9-(p-methylsulfinylbenzylidenyl) -1,2,3,4-tetrahydrofluorene-1-carboxylate.

Similarly, using 2-(2-methoxyethoxy)-ethanol, glycol or N-acetyl-ethanolamine in place of phenol in the above procedure gives 2-(2-methoxyethoxy)-ethyl 6-fluoro-9 -(p-methylsulfinylbenzylidene)-1,2,3,4-tetrahydrofluoroene-1-carboxylate, β-hydroxyethyl 6-fluoro-9-(p-methylsulfinylbenzylidene)-1,2,3,4-tetrahydrofluorene-1-carboxylate and β-acetamidoethyl 6-fluoro-9-(p-methylsulfinylbenzylidenyl)-1,2,3,4-tetrahydrofluorene-1-carboxylate respectively.

A mixture of .06 mole of sodium 6-fluoro-9-(p-methylsulfinylbenzylidene)-1,2,3,4-tetrahydrofluorene-1-carboxylate prepared by reacting the free acid (0.033 M) with sodium methoxide (25% solution in water) 7.4 ml. in 200 ml. of tetrahydrofuran, the precipitate filtered and dried and 0.05 mole of trityl bromide in 100 ml. anhydrous benzene is refluxed with rapid stirring under nitrogen for 5 hours. The hot reaction mixture is filtered and the filtrate is concentrated in vacuo. The residual oil is recrystallized from methyl ethyl ketone to give trityl 6-fluoro-9-(p-methylsulfinylbenzylidene)-1,2,3,4-tetrahydrofluorene-1-carboxylate.

Similarly, when 6-fluoro-9-(p-methylsulfinylbenzylidene)-1,2,3,4-tetrahydrofluorene-4-carboxylic acid or 5-fluoro-[α-carboxy-2,3-trimethano]-indene are used in place of the above-described acid in any of the above preparations, the corresponding esters are obtained.

EXAMPLE 10

Pivalloyloxymethyl-6-fluoro-9-(p-methylsulfinylcinnamylindene) -1,2,3,4-tetrahydrofluorene-1-carboxylate Triethylamine (1.2 g) in dimethylformamide (10 ml.) is added over 5 minutes to a stirred solution of the 1,2,3,4-tetrahydrofluorene-1-carboxylic acid (0.01 mole) in dimethylformamide (100 ml.) at room temperature. After 10 minutes pivalloyloxymethylchloride (1.9 g.) is added in dimethylformamide (10 ml.). The stirred solution is kept at 90° for 18 hours, poured into water (300 ml.) and extracted with ether (2 × 300 ml.). The ether extract is washed with sodium hydroxide solution (2.5N, 50 ml.), water (50 ml.) separated and dried (anhydrous magnesium sulfate). The crude product, isolated by evaporation, is purified by column chromatography on silica gel (Baker 80–100 mesh) in a 2 ft. × 1 in. column, eluting with methylene chloride.

The product isolated in this way is recrystallized from benzene-n-hexane.

Similarly, when an equivalent amount of the 1,2,3,4-tetrahydrofluorene-4-carboxylic acid and trimethano indene acid is used in place of the 1,2,3,4-tetrahydrofluorene -1-carboxylic acid above, there is obtained the corresponding pivalloyloxymethyl esters.

EXAMPLE 11

6Fluoro-9-(p-methylsulfinylbenzylidene)-1,2,3,4-tetrahydrofluorene-1-carboxymorpholide A mixture of 6-fluoro-9-(p-methylsulfinylbenzylidene) -1,2,3,4-tetrahydrofluorene-2-carboxylic acid (0.01 mole) and thionyl chloride (0.03 mole) in a dried flask, condenser and drying tube set-up is heated on the steam bath until evolution of gas ceases. Excess thionyl chloride is then removed in vacuo, the residue taken up in a slight excess of anhydrous ether and added slowly to a vigorously stirred, ice-cooled solution of dry morpholine (0.035 mole) in 100 ml. of ether. The mixture is stirred overnight at room temperature, filtered, the morpholine hydrochloride washed with 2 × 100 ml. water, dried over anhydrous sodium sulfate, filtered, and the ether removed in vacuo. Chromatography of the crude product on a silica-gel column, using v./v. 50–100 percent ether in petroleum ether as eluent gives the desired morpholide.

Similarly, when morpholine is replaced by an equivalent amount of the following amines, the corresponding amides are obtained:
Dimethylamino
Ethanolamine
Benzylamine
N,N-diethylethylenediamine
Benzylglycinate
Piperidine
Pyrrolidine
N-methylpiperazine
N-Phenylpiperazine
N-hydroxyethylpiperazine
Piperazine
Diethylamine
Diethanolamine Aniline
P-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-flucosamine
D-galactosylamine
D-mannosylamine
N,N-dimethyl-glycine amide
N,N-dibutylglycine amide
β-Ethoxyethylamine
Di(β-ethoxyethyl)amine
β-Phenethylamine
Dibenzylidene
D-mannosamine Similarly, when an equivalent amount of the 1,2,3,4-tetrahydrofluorene-4-carboxylic acid and 2,3-trimethanoindene acid is used in place of the 1,2,3,4-tetrahydrofluorene-1-carboxylic acid in the above example, there is obtained the corresponding morpholide compounds.

EXAMPLE 12

N-[6-fluoro-9-(p-methylsulfinylbenzylidene)-1,2,3,4-tetrahydrofluorene-1-carboxy]-glycine (A) Benzyl-N-[6-fluoro-9-(p-methylsulfinylbenzylidene)-1,2,3,4-tetrahydrofluorene-1-carboxy]-glycinate — The procedure of Example 9 is followed using benzylamino acetate in place of the morpholine to produce the above-named compound.

(B) Benzyl-N-[6-fluoro-9-(p-methylsulfinylbenzylidene)-1,2,3,4-tetrahydrofluorene-2-carboxy]-glycinate (0.003 mole) in a mixture of 25 ml. of anhydrous ethanol and 2.5 ml. of 1 N sodium hydroxide is allowed to stand at room temperature for 18 hours. The solution is diluted with water and extracted with ether. The aqueous layer is acidified with dilute hydrochloric acid and the organic product is extracted with ethyl acetate, washed with water and dried over sodium sulfate. Evaporation of the solution gives N-[6-fluoro-9-(P-methylsulfinylbenzylidene)-1,2,3,4-tetrahydrofluorene-1-carboxy]-glycine.

When an equivalent amount of the 1,2,3,4-tetrahydrofluorene-4-carboxylic acid and 2,3-trimethano indene acid is used in place of the 1,2,3,4-tetrahydrofluorene-1-carboxylic acid in the above example, there is obtained the corresponding glycine compound.

EXAMPLE 13

A mixture of 260 parts of 6-fluoro-9-(p-methylsulfinylbenzylidene)-1,2,3,4-tetrahydrofluorene-1-carboxylic acid and 25 parts of lactose is granulated with suitable wataer and to this is added 100 parts of maize starch. The mass is passed through a 16 mesh screen. The granules are dried at a temperature below 60°C. The dry granules are passed through a 16 mesh screen and mixed with 3.8 parts of magnesium stearate. They are then compressed into tablets suitable for oral administration.

Similarly, tablets are prepared by employing an equivalent amount of 6-fluoro-9-(p-methylsulfinylbenzylindene) -(p-methylsulfinylbenzylindene)--tetrahydrofluorene-4-carboxylic acid, and 5-fluoro-[α-carboxy-2,3-trimethano]-1-(p-methylsulfinylbenzylidene)-indene.

What is claimed is:
1. A compound of the formula:

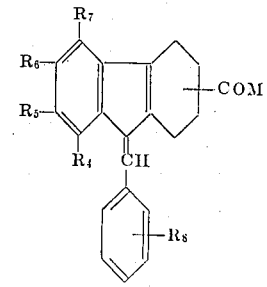

where
$R_4$, $R_5$, $R_6$ and $R_7$ are each hydrogen, halo, $C_{1-5}$ loweralkyl, halo $C_{1-5}$ loweralkyl, $C_{1-5}$ loweralkoxy, cyano, amino, $C_{1-5}$ loweralkylamino, $C_{1-5}$ diloweralkylamino, hydroxy, $C_{2-5}$ loweralkenyloxy or trifluoromethyl;

$R_8$ maybe hydrogen, halo, $C_{1-5}$ loweralkylthio, $C_{1-5}$ loweralkyl, $C_{1-5}$ loweralkylsulfonyl, $C_{1-5}$ loweralkylsulfinyl, nitro or $C_{1-5}$ loweralkoxy; and M is hydroxy, hydroxy $C_{1-5}$ lower alkoxy, $C_{1-5}$ loweralkoxy, $C_{1-5}$ loweralkoxyalkoxy, $C_{1-5}$ loweralkoxyalkoxyalkoxy, benzyloxy or phenoxy.

2. The compound of claim 1 wherein:
$R_4$, $R_5$ and $R_7$ are each hydrogen;
$R_6$ is fluoro;
$R_8$ is methylsulfinyl and in the para position;
M is hydroxy and
the carboxylic group is in the one position.

3. The compound of claim 1 wherein the carboxylic group is in the 1-position.

4. The compound of claim 1 wherein:
$R_4$, $R_5$, $R_6$ and $R_7$ are each hydrogen, fluoro, cyano, $C_{2-5}$ loweralkenyloxy, $C_{1-5}$ loweralkoxy or $C_{1-5}$ loweralkyl,
$R_8$ maybe hydrogen, $C_{1-5}$ loweralkylthio, $C_{1-5}$ loweralkylsulfinyl or $C_{1-5}$ loweralkylsulfonyl; and
M is hydroxy.

5. The compound of claim 4 wherein
$R_6$ is fluoro;
$R_4$, $R_5$, $R_7$ and $R_9$ are each hydrogen; and
$R_8$ is methylsulfinyl.

6. A compound of the formula:

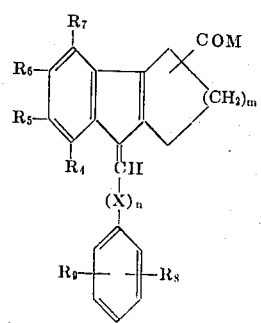

where
$R_4$, $R_5$, $R_6$ and $R_7$ are each hydrogen, halo, $C_{1-5}$ loweralkyl, halo $C_{1-5}$ loweralkyl, $C_{1-5}$ loweralkoxy, cyano, amino, $C_{1-5}$ loweralkylamino, $C_{1-5}$ diloweralkylamino, hydroxy, $C_{2-5}$ loweralkenyloxy or trifluoromethyl;

$R_8$ may be hydrogen, halo, $C_{1-5}$ loweralkyl, $C_{1-5}$ loweralkylthio, $C_{1-5}$ loweralkylsulfonyl, $C_{1-5}$ loweralkylsulfinyl, nitro, $C_{1-5}$ loweralkoxy, $C_{1-5}$ diloweralkylamino, $C_{1-5}$ loweralkylamino or amino;

$R_9$ may be hydrogen, halo, $C_{1-5}$ loweralkoxy, $C_{1-5}$ loweralkyl, nitro or $C_{1-5}$ alkylthio;

X is $C_{1-4}$ alkylene, $C_{2-4}$ alkenylene, $C_{2-4}$ alkynylene or -O-;

n is 0 or 1, m is 1 or 2; and

M is hydroxy, hydroxy $C_{1-5}$ loweralkoxy, $C_{1-5}$ loweralkoxy, $C_{1-5}$ loweralkoxyalkoxy, $C_{1-5}$ loweralkoxyalkoxyalkoxy, benzyloxy or phenoxy.

7. A compound of the formula:

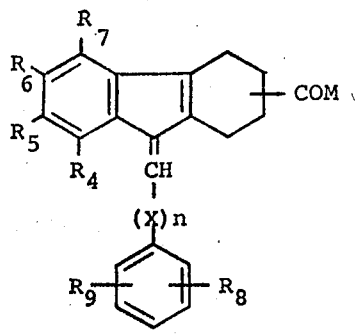

where $R_4$, $R_5$, $R_6$, and $R_7$ are each hydrogen, halo, $C_{1-5}$ loweralkyl, halo $C_{1-5}$ loweralkyl, $C_{1-5}$ loweralkoxy, cyano, amino, $C_{1-5}$ loweralkylamino, $C_{1-5}$ diloweralkylamino, hydroxy, $C_{2-5}$ loweralkenyloxy or trifluoromethyl;

$R_8$ may be hydrogen, halo, $C_{1-5}$ loweralkyl, $C_{1-5}$ loweralkylthio, $C_{1-5}$ loweralkylsulfonyl, $C_{1-5}$ loweralkylsulfinyl, nitro, $C_{1-5}$ loweralkoxy, $C_{1-5}$ diloweralkylamino, $C_{1-5}$ loweralkylamino or amino;

$R_9$ may be hydrogen, halo, $C_{1-5}$ loweralkoxy, $C_{1-5}$ loweralkyl, nitro or $C_{1-5}$ alkylthio;

X is $C_{1-5}$ alkylene, $C_{2-5}$ alkenylene, $C_{2-4}$ alkynylene or —O—;

n is 0 or 1; and

M is hydroxy, hydroxy $C_{1-5}$ loweralkoxy, $C_{1-5}$ loweralkoxy, $C_{1-5}$ loweralkoxyalkoxy, $C_{1-5}$ loweralkoxyalkoxy-alkoxy, benzyloxy or phenoxy.

8. A compound of the formula:

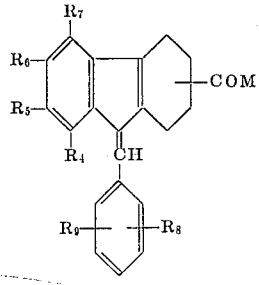

where $R_4$, $R_5$, $R_6$ and $R_7$ are each hydrogen, halo, $C_{1-5}$ loweralkyl, halo $C_{1-5}$ loweralkyl, $C_{1-5}$ loweralkoxy, cyano, amino, $C_{1-5}$ loweralkylamino, $C_{1-5}$ diloweralkylamino, hydroxy, $C_{2-5}$ loweralkenyloxy or trifluoromethyl;

$R_8$ may be hydrogen, halo, $C_{1-5}$ loweralkyl, $C_{1-5}$ loweralkylthio, $C_{1-5}$ loweralkylsulfonyl, $C_{1-5}$ loweralkylsulfinyl, nitro, $C_{1-5}$ loweralkoxy, $C_{1-5}$ diloweralkylamino, $C_{1-5}$ loweralkylamino or amino;

$R_9$ may be hydrogen, halo, $C_{1-5}$ loweralkoxy, $C_{1-5}$ loweralkyl, nitro, or $C_{1-5}$ alkylthio; and M is hydroxy, hydroxy $C_{1-5}$ loweralkoxy, $C_{1-5}$ loweralkoxy, $C_{1-5}$ loweralkoxyalkoxy, $C_{1-5}$ loweralkoxyalkoxy, benzyloxy or phenoxy.

9. A compound of the formula

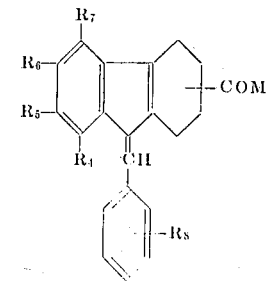

$R_4$, $R_5$, $R_6$ and $R_7$ are each hydrogen, halo $C_{1-5}$ loweralkyl, halo $C_{1-5}$ loweralkyl, $C_{1-5}$ loweralkoxy, cyano, amino, $C_{1-5}$ loweralkylamino, $C_{1-5}$ diloweralkylamino, hydroxy, $C_{2-5}$ loweralkenyloxy or trifluoromethyl;

$R_8$ may be hydrogen, halo, $C_{1-5}$ loweralkyl, $C_{1-5}$ loweralkylthio, $C_{1-5}$ loweralkylsulfonyl, $C_{1-5}$ loweralkylsulfinyl, nitro, $C_{1-5}$ loweralkoxy, $C_{1-5}$ diloweralkylamino, $C_{1-5}$ loweralkylamino or amino; and M is hydroxy, hydroxy $C_{1-5}$ loweralkoxy, $C_{1-5}$ loweralkokxy, $C_{1-5}$ loweralkoxyalkoxy, $C_{1-5}$ loweralkoxyalkoxy-alkoxy, benzyloxy or phenoxy.

* * * * *